United States Patent
Mintz (10) Patent No.: US 6,305,007 B1
(45) Date of Patent: Oct. 16, 2001

(54) OBJECT PROPERTY META MODEL EMULATOR FOR LEGACY DATA STRUCTURES

(75) Inventor: Eric Mintz, Metuchen, NJ (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/359,038

(22) Filed: Jul. 23, 1999

Related U.S. Application Data (60) Provisional application No. 60/094,107, filed on Jul. 24, 1998.

(51) Int. Cl.[7] ....................................................... G06F 9/45
(52) U.S. Cl. .................................. 717/1; 717/2; 717/11; 707/1; 707/4
(58) Field of Search ......................... 717/1, 2, 11; 707/1, 707/4

(56) References Cited

U.S. PATENT DOCUMENTS

| | | | |
|---|---|---|---|
| 5,499,371 | * | 3/1996 | Henninger et al. ..................... 717/2 |
| 5,764,973 | | 6/1998 | Lunceford et al. . |
| 5,924,074 | * | 7/1999 | Evans ....................................... 705/3 |
| 5,960,200 | * | 9/1999 | Eager et al. ............................. 717/5 |
| 6,016,392 | | 1/2000 | Jordan . |
| 6,016,495 | * | 1/2000 | McKeehan et al. ................. 707/103 |
| 6,073,129 | * | 6/2000 | Levine et al. ........................... 707/4 |
| 6,161,219 | * | 12/2000 | Ramkumar et al. ................... 717/11 |
| 6,192,369 | * | 2/2001 | Doan et al. .......................... 707/103 |
| 6,202,069 | * | 3/2001 | Blackman et al. .................. 707/103 |
| 6,219,673 | * | 4/2001 | Blackman et al. .................. 707/103 |

OTHER PUBLICATIONS

Title: Extending file systems using stackable templates, author: Zadok et al, source: USENIX Assoc, 1999.*

* cited by examiner

*Primary Examiner*—Mark R. Powell
*Assistant Examiner*—Chameli C. Das
(74) *Attorney, Agent, or Firm*—Baker & McKenzie (57) ABSTRACT

A method of wrapping legacy data structures enables the data structures to be used with an object-oriented program and enables a single object to access related attributes in multiple legacy data structures. In one embodiment, an interface class is defined for each pseudo property to be represented. A C++ wrapper is built around each legacy data structure that implements the interface that was defined in the abstract pseudo property class.

8 Claims, 7 Drawing Sheets

OBJECT PROPERTY META MODEL EMULATOR FOR LEGACY DATA STRUCTURES

CROSS-REFERENCES TO RELATED APPLICATIONS

This application claims the benefit of U.S. Provisional Application No. 60/094,107, filed Jul. 24, 1998.

FIELD OF THE INVENTION

The present invention is directed to computer software programs. More particularly, the present invention is directed to an interface between an object-oriented software program and a non-object-oriented software program.

BACKGROUND OF THE INVENTION

Object-oriented programming has become an increasingly popular model for writing computer software. An "object" contains both code (sequences of instructions) and data (information which the instructions operate on). The use of objects can improve the maintenance, reusability, and modifiability of software. Examples of object-oriented programming languages include C++, Smalltalk, and Java.

However, many older software programs are written in non-object-oriented languages. These programs can be referred to as "legacy" programs, and can be written in languages such as Fortran, Basic, and C. Many of these legacy programs include data structures and code structures that need to be used with newer object-oriented languages. Recreating these data structures so that they are compatible with an object-oriented language is time consuming and expensive. Therefore, it is desirable to have a way to interface these legacy data structures with newer object-oriented code.

Based on the foregoing, there is a need for a method and system for interfacing legacy software applications with object-oriented software applications.

SUMMARY OF THE INVENTION

One embodiment of the present invention is a method of wrapping legacy data structures so that an object-oriented program can manipulate their field as if they were properties. In one embodiment, an interface class is defined for each pseudo property to be manipulated. A C++ wrapper is built around each legacy data structure that implements the interface that was defined in the abstract pseudo property class.

DETAILED DESCRIPTION

One embodiment of the present invention is a method of wrapping legacy data structures so that the data structures can be used with an object-oriented program and a single property page can manipulate data contained in all applicable data structures. In one embodiment, an interface class is defined for each pseudo property to be manipulated. A C++ wrapper is built around each legacy data structure that implements the interface that was defined in the abstract pseudo property class.

Figure 1:
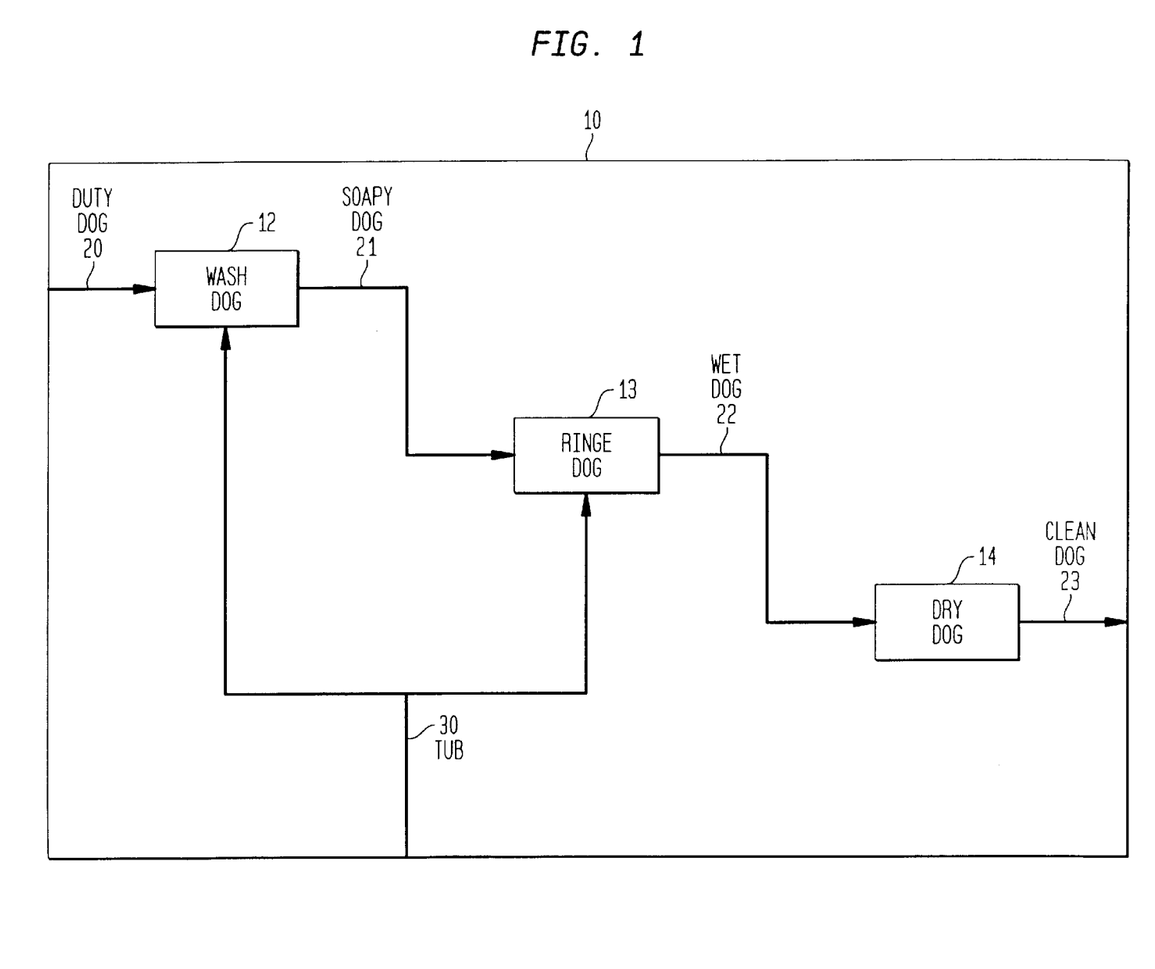
FIG. 1 is a graphical representation illustrating example output of a "legacy" application program having data structures.

FIG. 1 is a graphical representation illustrating example output from a "legacy" application program having data structures. A legacy application program, for the purposes of this patent, is an application program written in a non-object-oriented software programming language such as Fortran, Basic, or C. The legacy program of FIG. 1 is a business process application program that includes a graphical interface 10. The legacy program illustrates business processes and stores data and data structures for each facet of the business process.

In the example shown in FIG. 1, a process for "cleaning a dog" is illustrated. Interface 10 includes different components. For example, interface 10 includes boxes 12–14 that each represent an activity. Box 12 represents the activity of washing the dog, box 13 represents the activity of rinsing the dog, and box 14 represents the activity of drying the dog.

Interface 10 further includes arrows 20–23. Each arrow represents a relationship among activities, including input and output information. Arrow 20 indicates a dirty dog is input into activity 12, arrow 21 indicates a soapy dog is output from activity 12 and input into activity 13. Further, arrow 22 indicates a wet dog is output from activity 13 and input into activity 14, and arrow 23 indicates a clean dog is output from activity 14.

Interface 10 also includes an attribute 30 that indicates that a tub is used in activities 12 and 13. Interface 10 can also include an entity component, and many other types of components not shown in FIG. 1.

Each component visible in interface 10 can be selected and edited by a user. For example, a user can click on activity 13, or arrow 20. The components would each be considered a "class" if the program associated with interface 10 was written in an object-oriented language such as in C++. However, they are considered data structures in a non-object-oriented language such as C. When a component is selected to be edited, a separate dialog appears for each component.

Each component of interface 10 has one or more attributes or properties associated with it. The attributes are contained in data structures. Examples of attributes include a note that a user can attach to each component, a name of the component, a definition of a component, a duration of activity for a component, etc.

In general, an attribute or property is any value that is associated with a component of interface 10 or an entry in a dictionary associated with interface 10, or an entry in a list or a field in any data structure. With object-oriented software, the concept of reifying attributes and properties associated with an object is well known and is referred to as an "object property meta model".

One problem with interface 10 and the legacy program associated with it is that each component (e.g., arrows, activities, etc.) are represented in substantially different ways in the legacy code. For example, as discussed, each component can have a note attribute. A user that is doing modeling with the program can annotate an activity, an arrow, a data store, etc. to make a note for later reference. However, the legacy code contains a separate dialog routine for each component. Therefore, the legacy code requires writing a first dialog that puts data on an arrow, a second dialog that puts data on an activity, a third dialog that puts data on a data store, etc. Coding a separate dialog to edit each component is time consuming and expensive.

One embodiment of the present invention allows a user to develop a single property page that puts a note on any component and then fan out from that to activities, data stores, entities, attributes, etc. For example, a property page can allow a user to set note and definition properties on an arbitrary component. This allows one to reuse a common property page to set properties for any component which supports them. Inheritance and dynamic casting in C++ are used to accomplish this in one embodiment.

Figure 2:
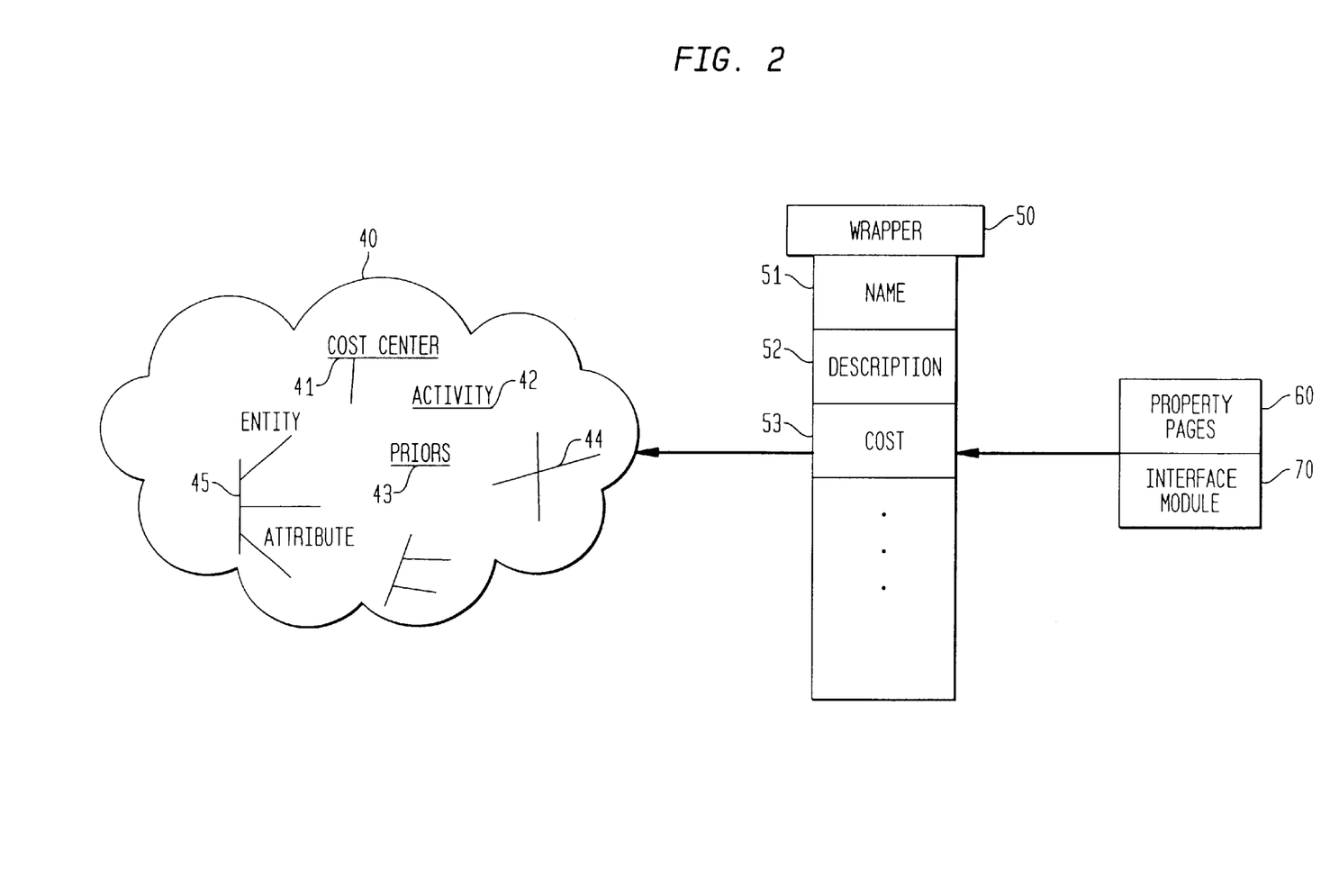
FIG. 2 is a architectural diagram of one embodiment of the present invention interfaced with a legacy program such as the program of FIG. 1 written in C.

FIG. 2 is a architectural diagram of the present invention interfaced with a legacy program such as the program of FIG. 1 written in C. The legacy program 40 contains multiple data structures 41–45 strewn about in a haphazard fashion. Each data structure has common properties such as name, description, etc. However, with a legacy programming language such as C there is no way to link together the common properties among data structures. The present invention allows these common properties to be coupled together.

A wrapper module 50 is coupled to legacy program 40. Wrapper module 50 is a wrapper object written in an object-oriented language such as C++. Associated with the wrapper object are objects 51–53 for each property such as a name object 51, a description object 52 and a cost object 53. Wrapper module 50 and property page 60 collaborate to use Run-Time Type Identification commands to impose order on the data structures of legacy program 40.

A property page or pages 60 is coupled to wrapper object 50. Property pages 60 is written in an object-oriented language such as C++.

An interface module 70 includes the remaining functionality of the present invention. Interface module 70 includes a hit handler that executes the steps that are performed when a component is selected in interface 10 of program 40.

In general, the present invention incorporates a single property page for manipulating a fixed set of values, and the use of that single property page to manipulate these values wherever they occurred. Therefore, for example, the property page which manipulates the definition text and note text would be used for any objects which have this property.

In effect, the present invention emulates an object/property metamodel. This technique isolates property values from the objects which contain them. Instead of containing a name value, an object having a "Name" property would be associated with an instance of the "Name" property class. When the system needs an object's name, it asks the object for the value of its "Name" property. The object scans its property list for an instance of the "Name" property, and if it finds one it returns its value. Otherwise it returns a failure indication. This procedure generalizes to any property of any basic type.

The present invention defines a base wrapper class. The new property pages interact with the legacy data structures via classes which descend from the base wrapper. This allows a separation of the implementation of the property pages from the details of the legacy data structures and provides a common interface for the manipulation of pseudo properties.

The present invention further defines a policy class (a base property class) for each property in the system. These classes define, but do not implement, methods which manipulate the property's value. For a simple property like "Note", the base property class specifies methods which get and set the property's value. Some property values require validation; policy classes for such properties must publish validation methods. For list properties, the base property classes define methods which provide access to iterators which traverse and manipulate the property values. These iterators are themselves specified as policy classes for maximum flexibility.

When a programmer wants to manipulate the properties associated with a component of interface 10 of FIG. 1 using the present invention, the programmer does the following:

1. Determine which legacy data structure(s) would be affected by the manipulation. In some instances, components on the screen are represented by multiple data structures.

2. Determine which properties were associated with the diagram component to be manipulated and assemble or create the requisite pseudo property policy interface classes.

3. Define a component wrapper class. This class is inherited from the base wrapper class (so as to be able to access the property page framework) and the policy class associated with each property that needs manipulation.

4. Implement the component wrapper class defined in the preceding step. The details of the implementation depend on the nature of the underlying legacy data structures.

5. Assemble (or implement, if required) the property pages which manipulate the desired properties.

The property page manipulates the wrapped legacy data structure(s) as follows:

Extract and display property values;

Validate user edits (i.e., new or altered property values); and

Post new property values to the wrapped legacy data structure(s)

To accomplish this, the programmer using one embodiment of the present invention implements the following methods in the property page.

| Method | Purpose |
| --- | --- |
| LoadFrom( ) | Extract data from the wrapped legacy data structure(s) and display same on the screen. |
| Validate( ) | Validate all user edits (i.e., newly entered or changed property values). |
| SaveTo( ) | Post all user changes back to the wrapped legacy data structure(s). |

Each of the methods receives a pointer to a base wrapper object, and must extract manipulated property values via this pointer. They accomplish this by using a dynamic_cast to convert the base wrapper pointer into a pointer to the policy class for the desired property. If the cast succeeds (i.e., returns a non-NULL result), the property page secures access to its desired property. If the cast fails, the property page takes appropriate action.

The present invention uses this C++ dynamic_cast statement to query the wrapper about the presence of a pseudo property. This is a novel way to simulate an object/property metamodel (wherein property values are stored separately from their owning objects) during the manipulation of legacy "C" data structures. This technique can be implemented with any object-oriented language which supports Run-Time Type identification (e.g., SMALLTALK, Java, EIFFEL, etc.).

The following flowcharts describe the combined functionality of wrapper module 50, property page 60 and interface module 70.

Figure 3:
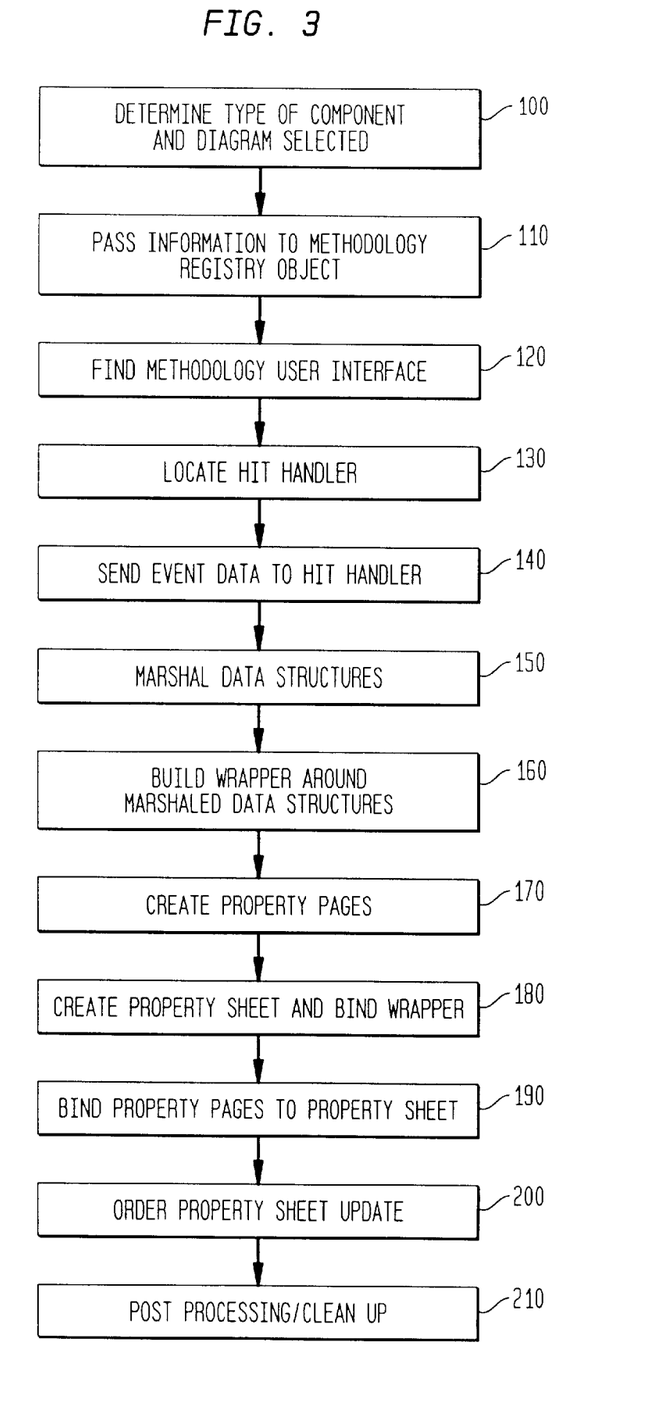
FIG. 3 is a flowchart of the steps executed when a user selects one of the components displayed by the interface of FIG. 1 in accordance with one embodiment of the present invention.

FIG. 3 is a flowchart of the steps executed when a user selects one of the components displayed by interface 10 of FIG. 1 in accordance with one embodiment of the present invention.

At step 100, the type of component (e.g., arrow, activity, etc.) that was selected is determined. If multiple types of diagrams can be displayed by interface 10, then the type of diagram selected is also determined at step 100. In one embodiment, interface 10 can display one of three diagram types.

At step 110, the information determined at step 100 is passed to a methodology registry object. The registry object is a set of code that knows how to handle different components and diagram types. This class has exactly one instance in the system.

At step 120, the methodology registry object finds the appropriate methodology user interface ("UI")-based handler object to handle for the event. There is a unique handler object for each diagram type.

At step 130, the appropriate hit handler is located. One hit handler exists for each type of component or object that are selectable by the user in the diagram. Examples of components include a box associated with an activity, a vertical or horizontal line segment, etc.

At step 140, the event data is sent to the hit handler located at step 130. The component type is stripped out of the event data because the hit handler already knows the component type. The hit handler is specialized for the component that the user selected.

At step 150, the hit handler marshals the data structures of legacy program 40 that will be affected by the hit. This varies by the type of component handled.

At step 160, the hit handler builds a wrapper around the marshaled data structures. There is one specific wrapper class for each object that could possibly be hit or selected by the user and for each type of diagram. Therefore, for example, a box in a process diagram has a different wrapper structure than a box in a data flow diagram.

At step 170, the hit handler creates the property pages which apply to the active component. These can include name, status, definition, etc., pages. The property pages are typically displayed as graphical "tabs" of an overall property sheet.

At step 180, the hit handler creates a property sheet that contains the property pages. The property sheet construction binds the sheet to the wrapper structure.

At step 190, the hit handler binds the property pages to the property sheet. The order of binding determines the tab order of the display.

At step 200, the hit handler orders the property sheet to perform the update by invoking the "Display and Perform Update" method. This step is where the interaction between the property page and interface 10 occurs.

Finally, at step 210 the hit handler performs any required post-processing. The hit handler also discards all property pages and the property sheet and wrapper structure used to process the component selected.

The following flowcharts provide details on how the property pages 60 function with respect to wrapper module 50. Each property page logic is driven off standard windows events. The main events handled are:

1) OnInit Dialog—Setup property page display;
2) OnApply—Validate and save data; and
3) OnCancel—Cancel edit.

Other events manage the help display and display state (appearance).

Property pages start out uninitialized. They become initialized when the user displays them. The framework ignores uninitialized pages.

Figure 4:
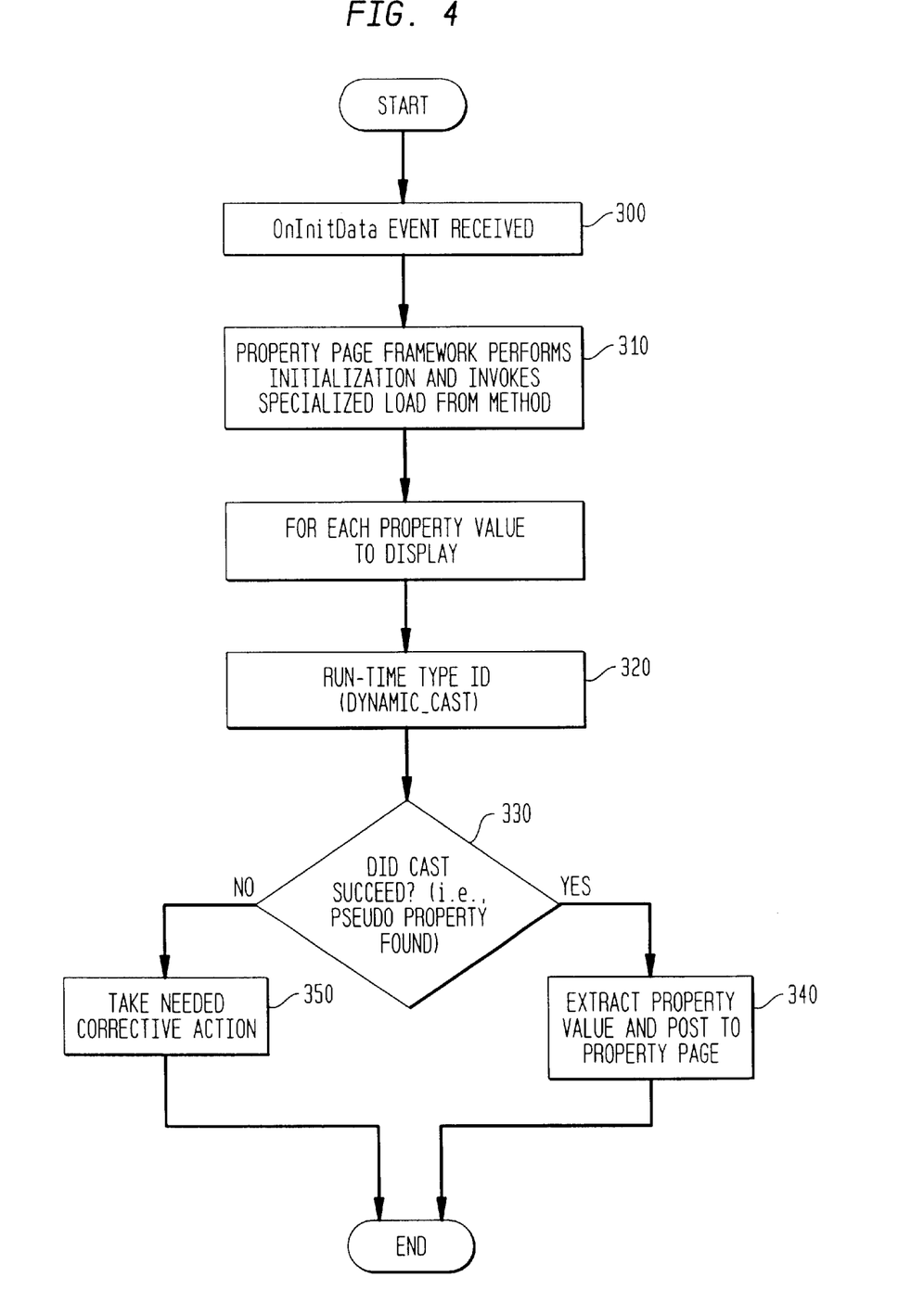
FIG. 4 is a flowchart of the steps executed for an OnInit-Data event in dance with one embodiment of the present invention.

FIG. 4 is a flowchart of the steps executed for an OnInitData event. At step 300 an OnInitData event is received by a property page. Step 300 is performed when a component is selected on interface 10 of FIG. 1, or a tab of a property sheet is selected. The OnInitData event tells the property page that it is about to be displayed for the first time and it should perform a setup.

At step 310, the property page framework performs Initialization and invokes a specialized LoadFrom method. This method differs from property page to property page.

At step 320, for each property value to display, Run-Time Type Identification is performed. In one embodiment, this is implemented in C++ by casting the wrapper pointer to the desired property type. The wrapper pointer is passed into the LoadFrom call. The cast is via a dynamic_cast operation and fails if the desired pseudo property does not belong to the wrapper. Belonging is via multiple Inheritance.

At step 330, it is determined if the cast succeeded. If the cast succeeds, then at step 340, the property value (e.g., name, note, definition, etc.) is extracted and posted to the property page for display.

If the cast failed at step 330, at step 350 corrective action, if needed is taken.

Figure 5:
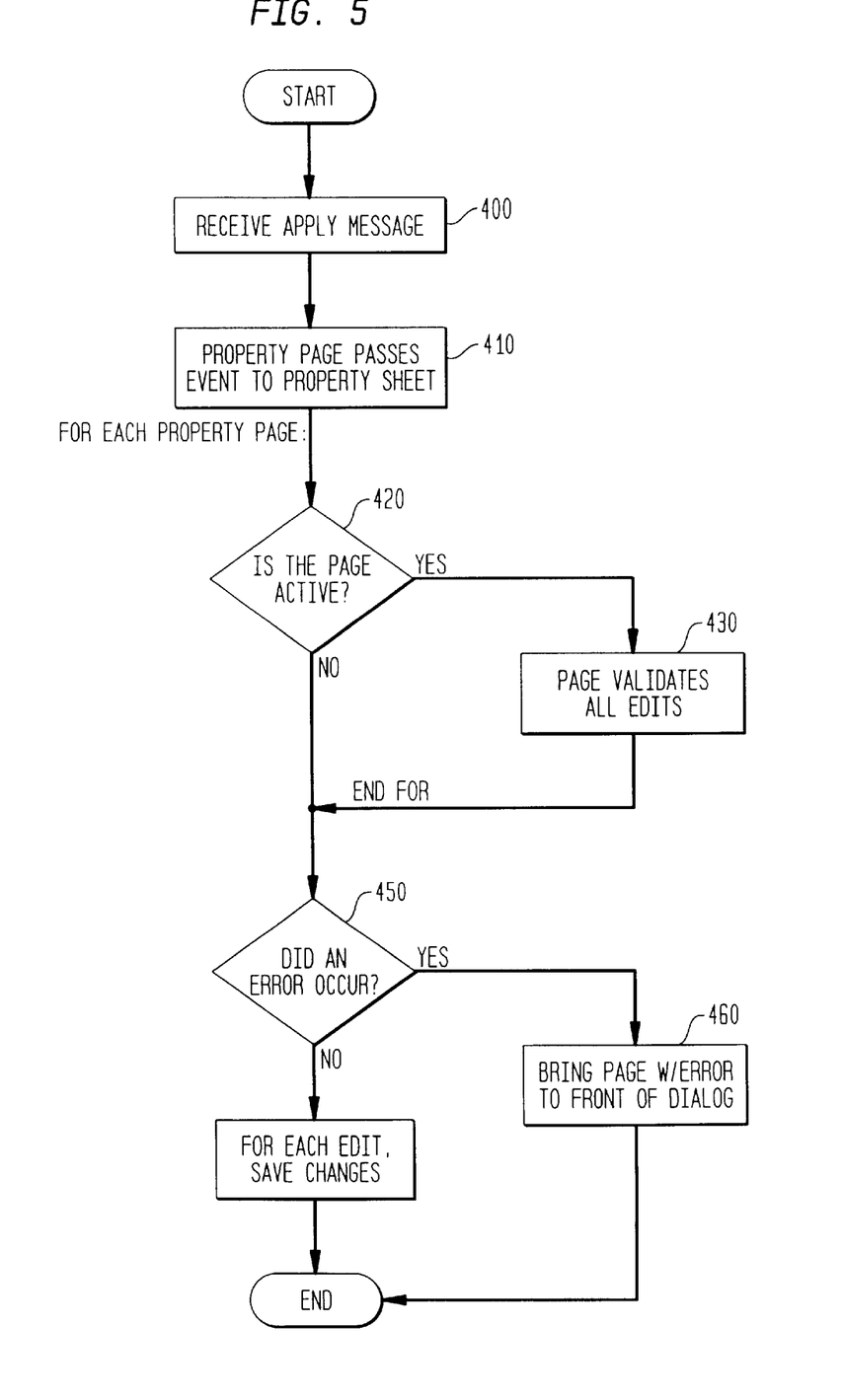
FIG. 5 is a flowchart of the steps executed when an Apply message is received and the data is saved in accordance with one embodiment of the present invention.

FIG. 5 is a flowchart of the steps executed when an Apply message is received and the data is saved. An Apply message indicates that the system should take any changed value and apply it to the underlying system (i.e., save the data).

At step 400, an Apply message is received because the user pressed OK or Apply on the property sheet.

At step 410, the receiving property page passes the event to the containing property sheet for processing At step 420, for each property page in the property sheet, it is determined if the page is active. If it is, at step 430 the page is asked to validate all of its edits.

At step 450, it is determined if an error occurred. If an error occurred, at step 460 the page with the error is brought to the front of the tabbed dialog.

If no error occurred at step 450, for each initialized display in the system in which an edit occurred, the properties that the user changed are saved.

Figure 6:
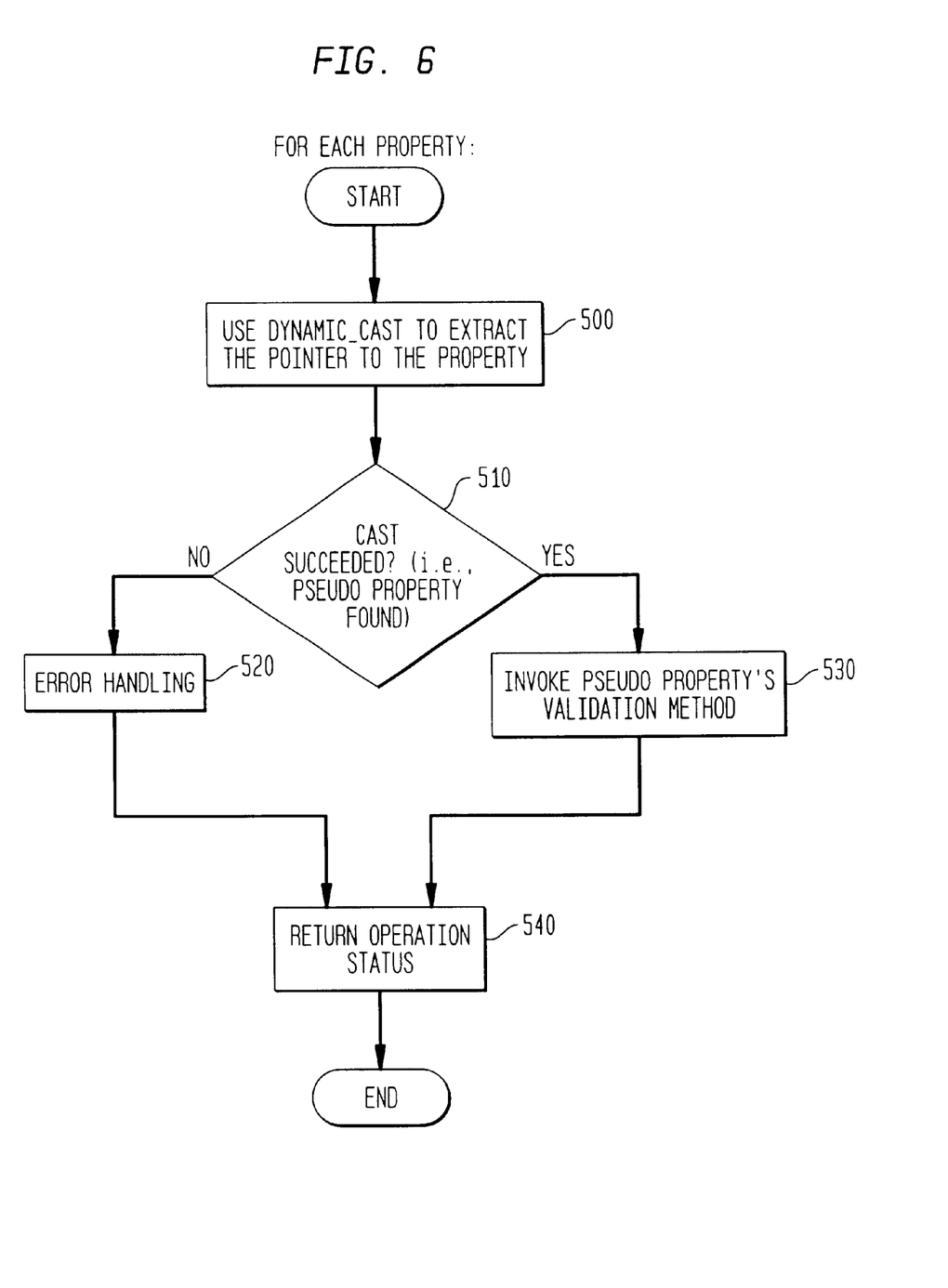
FIG. 6 is a flowchart of the steps executed when data is validated in accordance with one embodiment of the present invention.

FIG. 6 is a flowchart of the steps executed when data is validated in accordance with one embodiment of the present invention. Initially, the pointer to the base wrapper is passed to the call.

At step 500, for each property associated with the property page requiring validation, dynamic_cast is used to extract the pointer to the property.

At step 510, it is determined whether the cast succeeded. If not, at step 520 error handing is executed. Otherwise, the property page's validation method is invoked at step 530. Finally at step 540 the operation status is returned.

Figure 7:
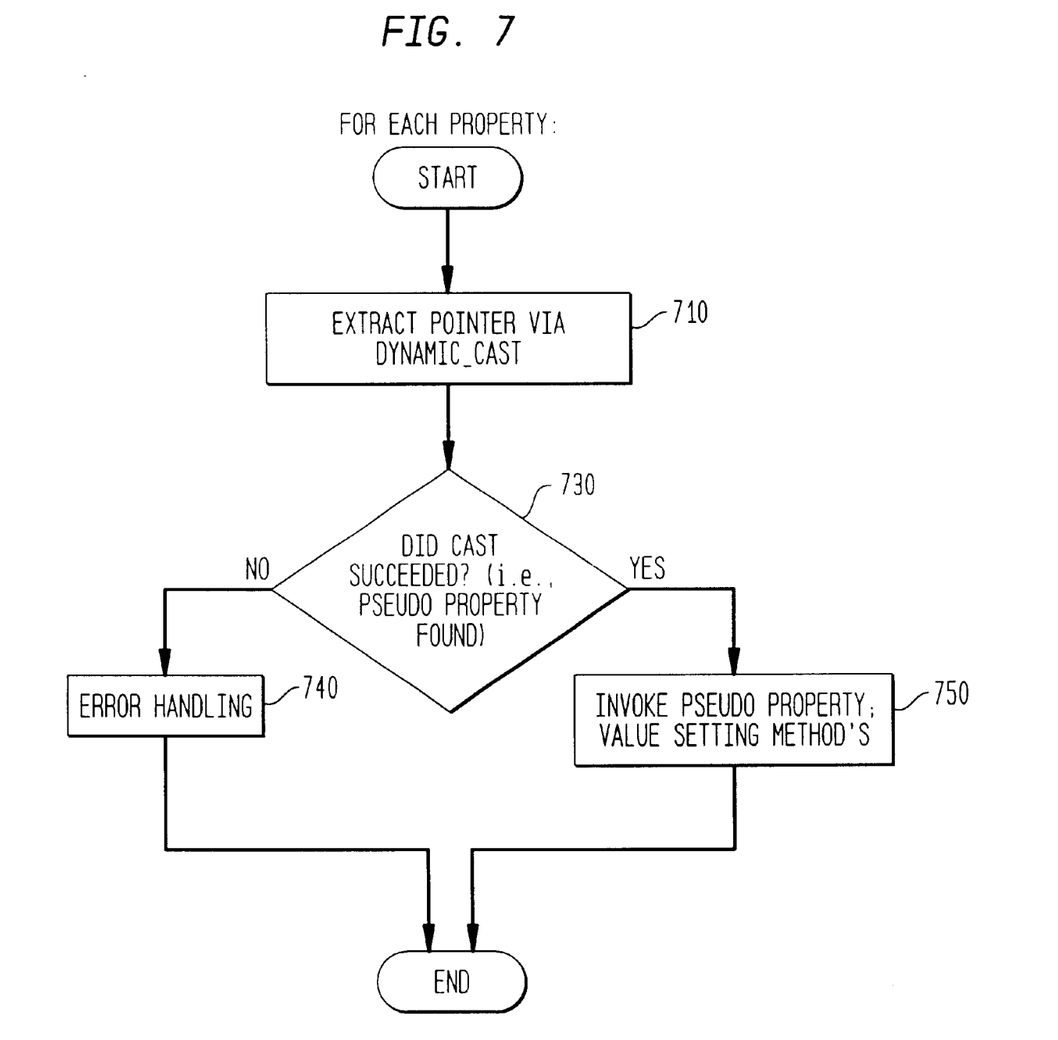
FIG. 7 is a flowchart of the steps executed when property values are saved in accordance with one embodiment of the present invention.

FIG. 7 is a flowchart of the steps executed when property pages are saved. At step 710, for each property that the page manipulates (e.g., name, definition, etc.) a pointer is extracted via Run-Time type Identification (i.e., dynamic cast).

At step 730, it is determined whether the cast succeeded. If not, at step 740 error handing is executed. Otherwise, the new property value is saved by invoking the appropriate method in the property class at step 750.

As described, the present invention provides a method of allowing legacy data structures to be used with an object-oriented program. Therefore, for example, a single property page can access relevant attributes in all of the legacy data structures. This allows the older legacy code to have some of the advantages of object-oriented code.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of manipulating an attribute of a legacy data structure, said method comprising:
   (a) receiving a pointer to a wrapper object that is bound to the legacy data structure;
   (b) defining a component wrapper class;
   (c) querying the wrapper class about the presence of a pseudo property; and
   (d) creating an object having access to the pseudo property
   (e) defining pseudo-property policy classes for each attribute type being manipulated;
   (f) reusing the pseudo-property policy classes to represent related attributes in the distinct data structures.

2. The method of claim 1, wherein step (c) comprises performing Run-Time Type Identification.

3. The method of claim 1, wherein step (c) comprises executing a dynamic_cast.

4. The method of claim 1, wherein the data structures are written in C.

5. The method of claim 1, wherein said object is written in C++.

6. The method of claim 1, wherein said object is written in Java.

7. The method of claim 1, wherein said object is a property page.

8. A method of manipulating attributes of legacy data structures, said method comprising:
   (a) defining a base wrapper class;
   (b) defining pseudo-property policy classes for each attribute type being manipulated;
   (c) defining one or more wrapper classes for each distinct set of legacy data structures to be manipulated;
   (d) basing each of the wrapper classes on the base wrapper class;
   (e) basing each of the wrapper classes on the pseudo-property policy classes;
   (f) reusing the pseudo-property policy classes to represent related attributes in the distinct data structures;
   (g) creating an object that manipulates the base wrapper class;
   (h) querying the wrapper classes about the presence of the pseudo-property; and
   (i) manipulating attributes in the data structures via the pseudo-properties implemented in a wrapper object.

* * * * *